US008621637B2

(12) United States Patent
Al-Harbi et al.

(10) Patent No.: US 8,621,637 B2
(45) Date of Patent: Dec. 31, 2013

(54) SYSTEMS, PROGRAM PRODUCT AND METHODS FOR PERFORMING A RISK ASSESSMENT WORKFLOW PROCESS FOR PLANT NETWORKS AND SYSTEMS

(75) Inventors: Saad A. Al-Harbi, Khobar (SA);
Hussain A. Al-Salem, Dhahran (SA);
Soloman M. Almadi, Dhahran (SA)

(73) Assignee: Saudi Arabian Oil Company (SA)

( * ) Notice: Subject to any disclaimer, the term of this patent is extended or adjusted under 35 U.S.C. 154(b) by 314 days.

(21) Appl. No.: 12/987,635

(22) Filed: Jan. 10, 2011

(65) Prior Publication Data
US 2012/0180133 A1 Jul. 12, 2012

(51) Int. Cl.
*H04L 29/06* (2006.01)

(52) U.S. Cl.
USPC .............................. 726/25; 713/188

(58) Field of Classification Search
USPC ......................................................... 726/25
See application file for complete search history.

(56) References Cited

U.S. PATENT DOCUMENTS

| 6,912,676 | B1 | 6/2005 | Gusler et al. | |
|---|---|---|---|---|
| 2002/0188496 | A1* | 12/2002 | Feldman et al. | 705/10 |
| 2002/0188870 | A1* | 12/2002 | Gong et al. | 713/201 |
| 2003/0208687 | A1* | 11/2003 | Liang et al. | 713/200 |
| 2004/0193907 | A1* | 9/2004 | Patanella | 713/200 |
| 2005/0114186 | A1* | 5/2005 | Heinrich | 705/7 |
| 2007/0078695 | A1* | 4/2007 | Zingelewicz et al. | 705/8 |
| 2007/0150955 | A1* | 6/2007 | Murase et al. | 726/23 |
| 2009/0182593 | A1 | 7/2009 | Whitmore | |
| 2010/0042451 | A1 | 2/2010 | Howell | |

FOREIGN PATENT DOCUMENTS

WO 02079907 A2 10/2002

OTHER PUBLICATIONS

International Search Report and Written Opinion for Related PCT Application PCT/US2012/020716, Jun. 12, 2012.
Herrmann, D.; "A Practical Guide to Security Engineering and Information Assurance", (2002) Chapters 1-7, XP002676206.

* cited by examiner

*Primary Examiner* — Yogesh Paliwal
(74) *Attorney, Agent, or Firm* — Bracewell & Giuliani LLP

(57) ABSTRACT

Systems, methods, and program product to perform a cyber security risk assessment on a plurality of process control networks and systems comprising a plurality of primary network assets at an industrial process facility, are provided. An example of a system and program product can include an industrial and process control systems scanning module configured to identify networks and systems topology and to execute system and network security, vulnerability, virus, link congestion, node congestion analysis to thereby detect susceptibility to know threats to define potential vulnerabilities; a threats to vulnerabilities likelihood and consequences data repository module configured to determine a likelihood of each of a plurality of known threats exploiting identified vulnerabilities and to identify consequences of the exploitation to individual impacted systems and to overall plant operation; and a risk level evaluator module configured to determine a risk level rating for any identified vulnerabilities and provide recommended corrective actions.

40 Claims, 5 Drawing Sheets

| CATEGORICAL LIKELIHOOD RATING | MEANING |
|---|---|
| VERY LIKELY | THE EVENT IS ALMOST CERTAIN TO OCCUR DURING THE ASSESSMENT TIME PERIOD; THERE IS A HISTORY OF THIS EVENT OCCURRING FOR SIMILAR SYSTEMS; LIKELIHOOD IS ABOVE 95% |
| LIKELY | IT IS QUITE LIKELY THAT THE EVENT WILL OCCUR, THERE IS SOME HISTORY FOR SIMILAR SYSTEMS; LIKELIHOOD IS THOUGHT TO BE BETWEEN 10% TO 95% |
| NOT LIKELY | IT IS POSSIBLE THAT THE EVENT WILL OCCUR BUT THERE MAY BE AN ABSENCE OF THREAT HISTORY; LIKELIHOOD IS THOUGHT TO BE BETWEEN 1% AND 10%. |
| REMOTE CHANCE | THIS EVENT IS CONSIDERED UNLIKELY TO OCCUR, THERE IS NO THREAT HISTORY FOR SIMILAR SYSTEMS; LIKELIHOOD IS BELIEVED TO BE BELOW 1% |

FIG.2.

| | IMPACT SEVERITY | | | |
|---|---|---|---|---|
| IMPACT CATEGORY | SEVERE | MAJOR | MINOR | NO IMPACT |
| INJURY | LOSS OF LIFE OR LIMB | RECURRING HOSPITALIZATION | CUTS, BRUISES, REQUIRING FIRST AID | NONE |
| FINANCIAL LOSS | GREATER THAN $10.0MM | $100.0M TO $10.0MM | $100.0M OR LESS | NONE |
| ENVIRONMENTAL RELEASE | PERMANENT DAMAGE/ OFF-SITE DAMAGE | LASTING DAMAGE/ ON-SITE DAMAGE | TEMPORARY DAMAGE/ LOCAL DAMAGE | NONE |
| INTERRUPTION OF PRODUCTION | HOURS | >30 MINUTES | <30 MINUTES | NONE |
| PUBLIC IMAGE | PERMANENT DAMAGE | LASTING BLEMISH | TEMPORARY TARNISH | NONE |

FIG.3.

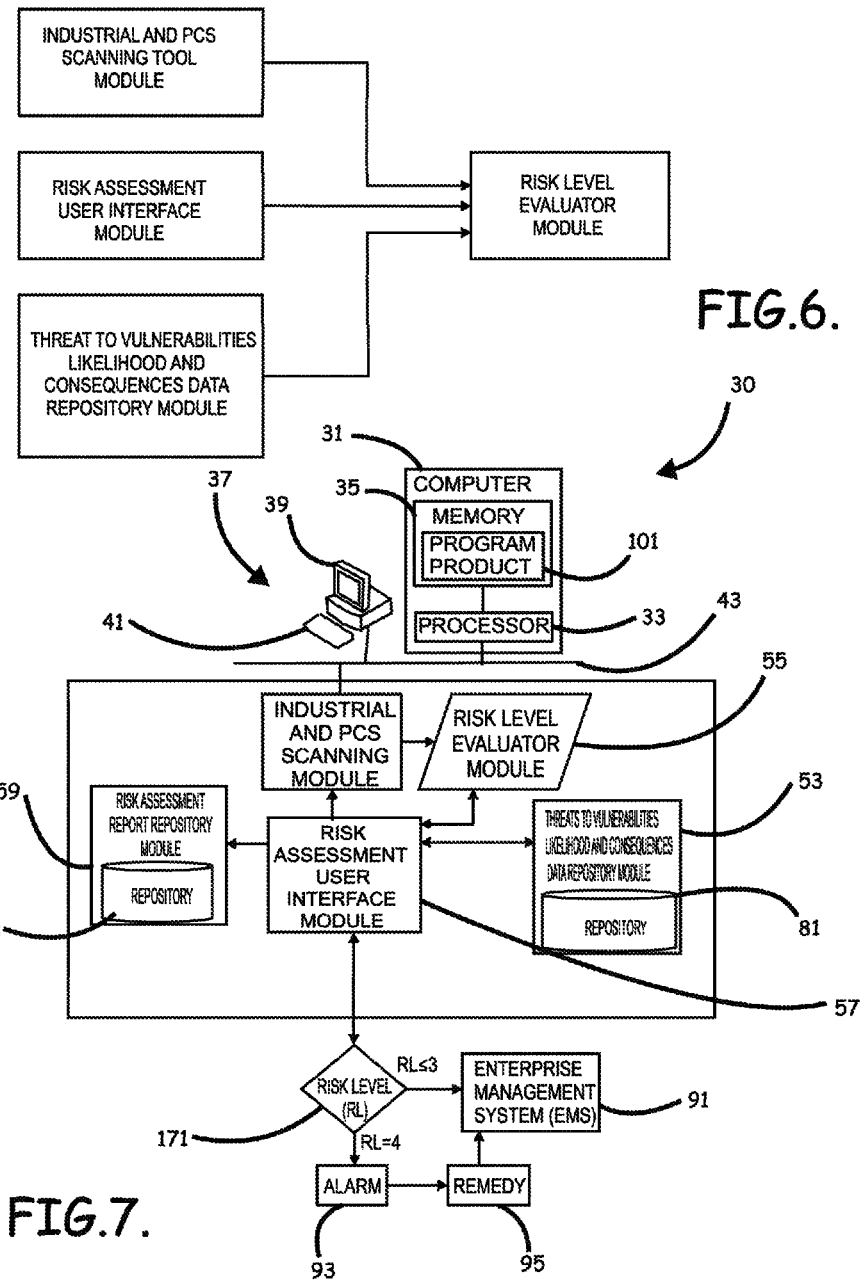

SYSTEMS, PROGRAM PRODUCT AND METHODS FOR PERFORMING A RISK ASSESSMENT WORKFLOW PROCESS FOR PLANT NETWORKS AND SYSTEMS

BACKGROUND OF THE INVENTION

1. Field of the Invention

The present invention relates generally to automated industrial processes. In more particular aspects, the present invention relates to managing risk for process control networks and systems in an industrial facility.

2. Description of the Related Art

The architecture of modern industrial operations, such as that found in modern oil and gas field applications is enabled at the field-level, process-level, and the system-level by various networked devices. These devices monitor and collect data, such as measurements, reflective of the operations of the automated process, such as, for example, pressure, temperature, pH, or flow. These devices are connected to or in communication with machines known as controllers that operate at different levels to process the data collected and issue commands back to, or to other, networked devices.

In a typical configuration, these components form Plant Networks and Systems (PN&S). Also in the typical configuration, the control system portion of the PN&S includes but is not limited to, Distributed Control Systems, Supervisory Control Data Acquisition Systems, etc. These industrial networks and systems can be connected to multiple networks within the plant or other industrial process facility or through networks external to the facility. This makes such "industrial networks" extremely susceptible to both internal and external cyber attacks and other security threats. Such cyber attacks can result in, among other things, a "loss of view" and/or a "loss of control" of individual components or entire network or system structures. A loss of view occurs when the user/automated controller is unable to access a system, either partially or fully, and thus, has no view of the process operation. A loss of control occurs when the user/automated controller is unable to send and/or receive control messages to the process control system to invoke a function and or a procedure.

Cyber security measures applied to PN&S have generally taken the form of those applied to Information Technology (IT) systems, and thus, have been relatively ineffective. As recognized by the inventors, some of the reasons for the ineffectiveness include the reality that PN&S is focused on machine and production and IT systems focus on people communication; that PN&S supports industrial applications that manage instruments, controllers, and process machines as compared to commutation between people or computers managed by IT systems; and that in PN&S, the end user is normally a computing instrument or device having a high level of vulnerability whereas in IT systems, the end user is normally a human. The inventors have also recognized that PN&S supports parallel systems and networks running concurrently; and that PN&S employs layered systems and networks which require an in depth analysis well beyond that capable of security measures developed for IT systems. The inventors have additionally recognized that "availability," "integrity," and "confidentiality," are the priority order for PN&S as compared to "confidentiality," "integrity," and "availability," for IT systems; and as such, the focus of both security and risk can be vastly different. Further, security standards for PN&S need to primarily address process control and instrument systems as compare to those for IT systems which generally support communication. The inventors have further recognized that "loss of control" and "loss of view" can be essential in PN&S as compared to IT systems, and thus, security policies must be different for system, instrument and controller than that of an IT computer or end user communication device to satisfy the unique security requirements of PN&S. Still further, risk criteria and risk level can be significantly different for PN&S over that of IT systems as a loss of view or control can result in injury to plant personnel and/or environmental release, among others, which would not be expected to be a factor in a pure IT system.

Risk level to industrial systems is generally conventionally quantified via a manual process and/or with relatively limited automated assistance. Such conventional forms of the assessment process can not only be extremely time-consuming and labor-intensive, but can be excessively prone to error due, for example, due to the lack of available data required to measure the risk level, threat and vulnerability likelihood, etc. Also, the consequences of a certain threat is difficult to quantify. In addition, the manual process is highly dependent on skilled analysts and their level of expertise, making the manual process not only excessively costly (monetarily), but also extremely subjective. Hence, such manual estimation of risk, vulnerability, etc., associated threat and associated consequences are highly susceptible to inconsistencies. This can be especially true across different systems and plants within a company or industry as the risk facing such different systems/entities can be vastly different.

Accordingly, the inventors have recognized the need for systems, program product, and methods which automate the complete risk assessment workflow process for PN&S. Particularly, recognized by the inventors is the need for automated systems, program product, and methods which can identify primary networked assets and their vulnerabilities, determine the effect of known threats on such vulnerabilities, determine the various costs associated with exploitation of such vulnerabilities by the known threats, determine the likelihood of occurrence, determine or assign a risk level/rating of such occurrence, provide recommended actions to reduce the risk level/rating, and facilitate execution of a mitigation plan for each identified vulnerability with respect to one or more of the known threats. Also recognized by the inventors is the need for automated systems, program product, and methods which can provide "templates" defined, for example, in different system modules, for the end user to enter all of the relevant variables, which can correlate networks and systems scanning outcomes to gathered data and templates, and which can exchange the templates between different system modules as necessary to achieve the overall objective, to thereby reduce the dependency and/or need for specialized professionals to support data mining, mapping and reporting and other such complex exercises as defined by the risk assessment process.

SUMMARY OF THE INVENTION

In view of the foregoing, various embodiments of the present invention advantageously provide systems, program product, and methods of performing a cyber security risk assessment on a plurality of process control networks and systems comprising a plurality of primary network assets at an industrial process facility, which can automate the complete risk assessment workflow process for Plants Networks and Systems (PN&S) including all devices, systems, and subsystem with Ethernet interfaces, and which can function to minimize the human interaction in implementing the risk assessment process, to thereby advantageously produce more accurate and less subject results in quantifying the risk level.

Various embodiments of the present invention also advantageously provide systems, program product, and methods which can identify primary networked assets and vulnerabilities, determine the effect of known threats on such vulnerabilities, determine the various costs associated with exploitation of such vulnerabilities by the known threats, determine the likelihood of occurrence, determine or assign a risk level/rating of such occurrence, provide recommended actions to reduce the risk level/rating, and facilitate execution of a mitigation plan for each identified vulnerability with respect to one or more of the known threats to single, redundant (parallel), and interconnected networks, systems and other control and/or networked components. Various embodiments of the present invention further advantageously provide systems, program product, and methods which can provide "templates" defined, for example, in different system modules, for the end user to enter all of the relevant variables, which can correlate networks and systems scanning outcomes to gathered data and templates, and which can exchange the templates between different system modules as necessary to achieve the overall objective, to thereby reduce the dependency and/or need for specialized professionals to support data mining, mapping and reporting and other such complex exercises as defined by the risk assessment process.

More specifically, an example of an embodiment of a method of performing a cyber security risk assessment on a plurality of process control networks and systems includes the step of inventorying or otherwise identifying each of the plurality of primary networked assets within the plurality of process control networks and systems to thereby identify associated networks and systems topology, network systems and asset security, and asset utilization, and the step of analyzing network asset integrity. The step of analyzing network asset integrity can include identifying networks and systems topology, network systems and asset security, and asset utilization to thereby determine susceptibility to each of one or more known threats. This data can be utilized to identify each of one or more network and other existing and/or potential networked asset vulnerabilities associated with each of the known threats. The method can also include determining a loss value associated with loss of control of each networked asset (individual or functional group) capable of affecting control within the system, for each of one or more impact categories. According to an exemplary configuration, the impact categories can include injury, financial loss, environmental release, interruption of production, and public image associated with a loss of control of the respective asset.

The method can further include performing various steps directed to each of the one or more known threats for each separate identified vulnerability exploitable by the respective threat. The steps can include determining a categorical likelihood (e.g., threat likelihood) of occurrence of an undesirable event associated with exploitation of each respective associated identified vulnerability by the respective threat to thereby determine a separate categorical likelihood rating (e.g., very likely, likely, . . . ) for the respective threat with reference to each respective associated identified vulnerability, and determining a categorical impact severity level (e.g., threat consequences) defining anticipated consequences of loss of control associated with exploitation of each respective identified vulnerability exploitable by the respective threat for each impact category. The steps can also include determining a risk level rating responsive to the categorical likelihood rating and the highest impact severity level rating for the respective threat with reference to each respective identified vulnerability exploitable by the respective threat, where risk level is a factor of threat likelihood, vulnerability likelihood, and consequences. According to a preferred configuration, the risk level is determined based on the following RISK equation: RISK=(THREAT×VULNERABILITY)×CONSEQUENCE. In this formula the "threat×vulnerability" segment represents the probability of the unwanted event occurring, and the "loss effect" represents the consequence of the loss of the asset to the organization.

Advantageously, the threat likelihood rating, impact severity level, impact categories, and threat consequences can be predefined and stored in a reference repository. The steps of determining a categorical likelihood of occurrence of an undesirable event associated with exploitation of each respective associated identified vulnerability by the respective threat and determining a loss value associated with loss of control of the respective asset for each of a plurality of impact categories can include use of an automated system referencing external databases and/or distributing a questionnaire to at least one systems security expert (e.g., analyst, security organization, and/or owner) to receive and store data comprising threat to vulnerabilities likelihood and loss valuation data. Further, a preformatted consequences-impact severity level table/matrix comprising a plurality of impact categories (e.g., injury, financial loss, environmental release, interruption of production, public image . . . ), with reference to a plurality of impact severity levels, further referencing the identified effect/consequences of the potential undesirable event can be used for analyzing and determining the impact severity level of an undesirable event for each category. Similarly, a preformatted risk level table/matrix comprising a plurality of threat likelihood categories (e.g., very likely, likely, not likely, remote chance) with reference to a plurality of threat consequences impact levels (e.g., severe, major, minor, no impact), with further reference to numerical risk level values (e.g., level 1, level 2, level 3, level 4) can be used to determine a numerical risk level rating to thereby standardize what has previously been otherwise haphazard risk level assessment determinations.

The method can also include determining a highest risk level associated with each of one or more threats capable of exploiting the respective vulnerability when so existing for each identified network and asset vulnerability, identifying and selecting an optimal mitigation plan from a plurality of mitigation plans responsive to the highest determined risk level, and executing the selected mitigation plan.

Various embodiments to the present invention also include systems to perform a cyber security risk assessment on a plurality of process control networks and systems comprising a plurality of primary network assets at an industrial process facility. According to an example system, the system includes a cyber security risk assessment computer, a threats to vulnerabilities likelihood and consequences data repository stored in memory accessible to the cyber security risk assessment computer, a risk assessment report data repository stored in memory accessible to the cyber security risk assessment computer, and cyber security risk assessment program product stored in the memory of the cyber security risk assessment computer to perform the cyber security risk assessment on the plurality of process control networks and systems. The program product, forming part of the overall system or stored on an individually distributable computer readable medium, includes a set of instructions or a plurality of sets of instructions represented as modules that when executed by a computer such as the cyber security risk assessment computer cause the computer to perform various risk assessment operations.

Accordingly, the computer and program product can include an industrial and process control systems scanning module configured to identify networks and systems topology of the plurality of process control networks and systems for the industrial process facility through an automated process and to execute system and network security, vulnerability, virus, link congestion, node congestion analysis to thereby detect susceptibility to know threats (e.g., potential vulnerabilities). According to an exemplary configuration, the node congestion analysis includes determining a level of traffic through each link and a level of performance, traffic, and node CPU utilization for each node. Further, the industrial and process control systems scanning module can be further configured to correlate networks and systems security configurations with optimal configurations to identify any variances therebetween when so existing.

The system and program product can also include a threats to vulnerabilities likelihood and consequences data repository module configured to determine a likelihood of at least one, but more typically a plurality of known threats exploiting one or more identified vulnerabilities in response to the identified networks and systems topology. The threats to vulnerabilities likelihood and consequences data repository module is also configured to identify consequences of the exploitation to individual impacted systems and to overall plant operation in response to a determined loss value associated with loss of control of each respective networks and systems asset for each of a plurality of impact categories.

According to the exemplary configuration, the threats to vulnerabilities likelihood and consequences data repository module is further configured to perform for each of the plurality of known threats and for each separate identified vulnerability exploitable by the respective threat, the operation of determining a categorical likelihood of occurrence of an undesirable event associated with exploitation of each respective associated identified vulnerability by the respective threat to thereby determine a separate categorical likelihood rating (e.g., very likely, likely, . . . ) for the respective threat with reference to each respective associated identified vulnerability. The threats to vulnerabilities likelihood and consequences data repository module is also further configured to determine a categorical impact severity level (e.g., threat consequences) defining anticipated consequences of loss of control or view associated with exploitation of each respective identified vulnerability exploitable by the respective threat for each separate one of the plurality of impact categories to thereby determine a highest impact severity level rating associated with the plurality of impact categories and/or associated risk level. Still further, according to a preferred implementation, the threats to vulnerabilities likelihood and consequences data repository module is further configured to perform the operations of distributing a questionnaire to at least one systems security expert (e.g., analysts, security organization, and/or owner) and receiving questionnaire data comprising threat to vulnerabilities likelihood and loss valuation data to thereby determine the categorical likelihood of occurrence of an undesirable event associated with exploitation of each respective associated identified vulnerability by the respective threat and to thereby determine the loss value associated with loss of control or view of the respective asset associated with exploitation of the respective identified vulnerability exploitable by each respective threat.

The system and program product can also include a risk level evaluator module configured to determine a numerical risk level rating for any identified vulnerabilities responsive to a determination of a categorical impact severity level and likelihood of the respective vulnerability being exploited by a known threat associated with the respective vulnerability. The risk level evaluator module, according to a preferred implementation, is further configured to determine a highest risk level associated with each threat or threats capable of exploiting each respective vulnerability when so existing for each of a plurality of impact categories.

The risk level evaluator module, according to a preferred implementation, is also configured to provide recommended corrective actions. The recommended corrective actions can include, for example, recommending an operating system batch upgrade as a corrective action based upon a capability analysis of a current operating system batch and any detected anomalies, recommending antivirus upgrade requirements as a corrective action based upon a capability analysis of a current version of antivirus software running on a system and any detected anomalies, and/or recommending link and node network structure changes as a corrective action based upon detecting sustained activity through one or more links or nodes exceeding or failing to exceed a threshold level of activity.

Still further, the risk level evaluator module, according to a preferred implementation, is configured to initiate an alarm and remedy (e.g., mitigation plan) without additional human intervention for each identified network and asset vulnerability assigned a maximum risk level value and to transfer risk assessment data to an enterprise management system for each identified network asset vulnerability having a certain risk level of less than the maximum risk level. In this configuration, the system and program product concentrate automated assets on only the most important risks, leaving less important risks to be further examined by management to determine whether or not or when resources should be expanded to mitigate the vulnerability.

It should be noted that where existing automated methods are primarily focused on a pure IT infrastructure which follow different cyber security standards and where the threat and vulnerabilities likelihoods which have consequences measures that different than those for the PN&S, embodiment of the present invention advantageously provide an industry specific application targeting critical infrastructure that addresses vulnerabilities to PN&S. Accordingly, various embodiments of the present invention advantageously provide an automated risk assessment workflow process to assess the PN&S from a cyber perspective that is industry specific for oil and gas PN&S, but which can be readily extended to be used for other process automation based industries such as substations, water utilities, etc.

Advantageously, various embodiments of the present invention assess risk based on risk level equation factors, such as, for example, the threats/vulnerabilities likelihood and consequence of a resulting undesirable event that are predefined from an established knowledge base of these factors as well as all assets inventories. As a result of the application of standard formatting and/or templates, such risk assessments can advantageously be periodically run to thereby detect progressions which would otherwise go unnoticed when examining only a single discrete risk assessment.

Further, various embodiments of the present invention advantageously provide tools to allow for the issuance of automated reports that cater to different layer of management, and which are consistent across all organizations. These reports can include charts showing color-coded risk scores, tables, graphs and statistics. These reports can also advantageously be easily edited and customized by the analyst to suit in the unique requirements of the end user of the reports.

Contrary to the results provided by manual risk assessments, the automated methodology according to various embodiments of the present invention can evaluate networks and systems weaknesses in a much shorter time frame. The various automated risk analysis tools are easily adaptable to operational and administrative systems of all sizes and generally allow the user to explore quickly the results of implementing certain safeguards. In addition, advantageously, according to various embodiments of the present invention, risk analysis does not require a highly skilled analyst, and human involvement in the workflow process can be minimal. Further advantageously, according to various embodiments of the present invention, the PN&S Administrator can perform a risk analysis in a period that is estimated at be a third or less of the manual workflow. It is anticipated that the tools provided according to various embodiments of the present invention will result in a dramatic reduction in man-hours by more than approximately 60%, improve quality, enhance engineer's knowledge, and simplify and decentralize the risk assessment process.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 2 is a likelihood rating table/matrix according to an embodiment of the present invention;

FIG. 3 is a consequences-impact severity level table/matrix according to an embodiment of the present invention;

FIG. 6 is a schematic diagram illustrating partial dataflow between system modules according to an embodiment of the present invention; and FIG. 7 is a combination schematic block diagram and schematic flow diagram illustrating risk level processing according to an embodiment of the present invention.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

FIGS. 1-7 illustrate exemplary systems, program product, and methods of performing an automated cyber security risk assessment workflow process primarily configured for Plants Networks and Systems ("PN&S") in the oil and gas industry, but which can be readily extended to be used for other process automation based industries such as substations, water utilities, etc.

Figure 1:
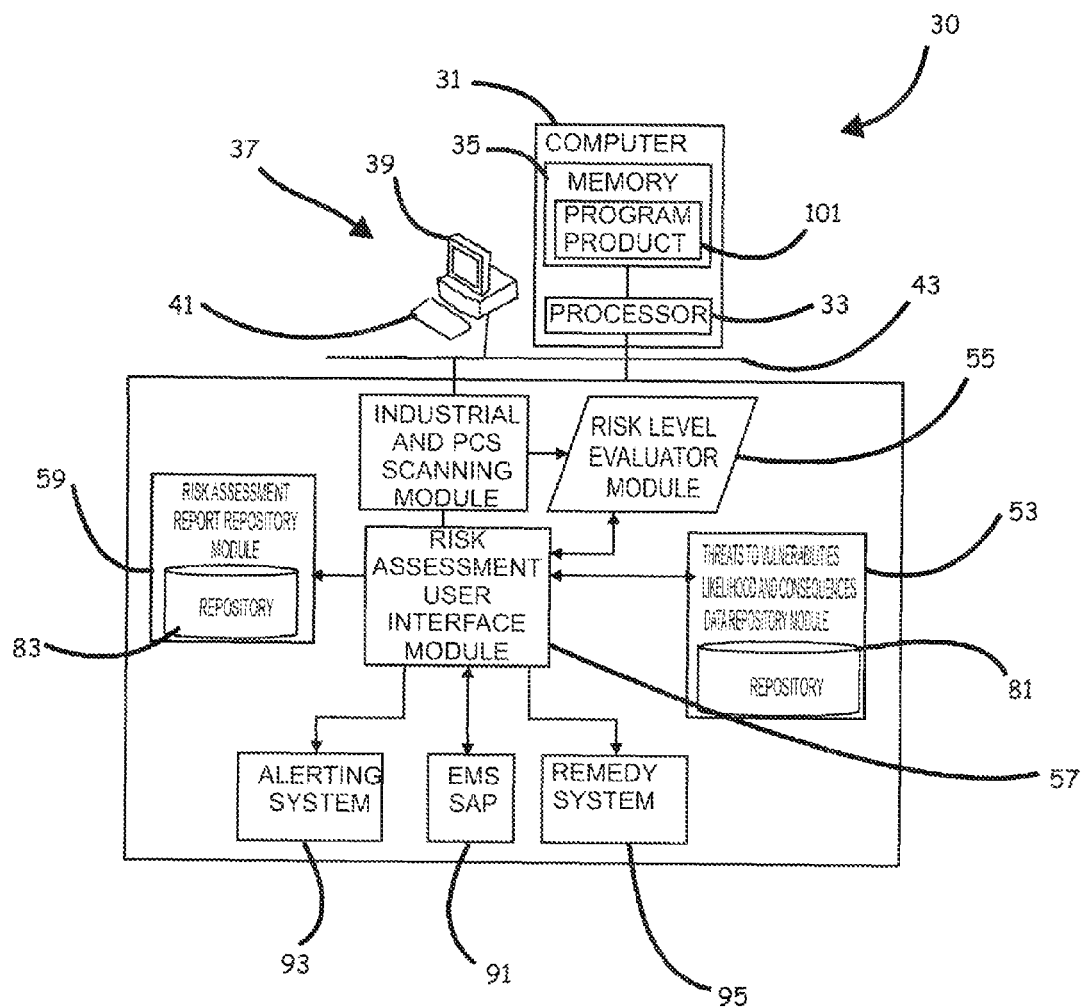
FIG. 1 is a schematic diagram of a general system architecture of a system to perform a cyber security risk assessment on a plurality of process control networks and systems comprising a plurality of primary network assets at an industrial process facility according to an embodiment of the present invention.

As perhaps best shown in FIG. 1, an example of an industrial and process control application risk assessment system 30 for performing an automated cyber security risk assessment on a plurality of process control networks and systems includes a cyber security risk assessment computer 31 having a processor 33, memory 35 coupled to the processor 33 to store software and database records therein, and a user interface 37 that can include a graphical display 39 for displaying graphical images, and a user input device 41 as known to those skilled in the art, to provide a user access to manipulate the software and database records. Note, the computer 31 can be in the form of a personal computer or in the form of a server serving multiple user interfaces 37. Accordingly, the user interface 37 can be either directly connected to the computer 31 or through a network/network bus 43 as known to those skilled in the art.

The system 30 can also include an industrial and process control systems scanning module 51, a threats to vulnerabilities likelihood and consequences data repository module 53, a risk level evaluator module 55, a risk assessment user interface module 57, and a risk assessment report repository module 59, which can be implemented in either hardware or software. When implemented in software, at least portions of the modules are generally stored in memory 35 of the cyber security risk assessment computer 31, with the remaining portions, if any, stored in memory (not shown) external to, yet accessible by, the cyber security risk assessment computer 31. Note, although described as performing certain functions, one of ordinary skill in the art would understand that such functions are functionally performed through execution of software/program product instructions on a computer and/or processor and that the program product/software modules described herein comprise a set of instructions executable by such computer.

As noted previously, the conventional manual process is fully dependent on professionals and their level of expertise. Hence, the consistency of a risk assessment of a system may be different between different systems, plants within a company, and or an industry. Moreover, such methodologies of estimating risk, vulnerability, associated threats, and associated consequences are susceptible to inconsistencies. Beneficially, the automated system provides "templates" for the end user to enter all of the relevant variables. Moreover, the templates are exchanged between the different system modules to achieve the overall objective.

The system 30 can also include one or more tables/matrices and/or databases stored in memory (internal or external) that is operably coupled to the cyber security risk assessment computer 31, as understood by those skilled in the art. The one or more tables can include a likelihood rating table/matrix 71 shown, for example, in FIG. 2, a consequences-impact severity level table/matrix 73 shown, for example, in FIG. 3, and a risk level ratings table/matrix 75 shown, for example, in FIG. 4. The one or more databases can include a threats to vulnerabilities likelihood and consequences data repository 81 (see, e.g., FIG. 1), and a risk assessment report repository 83.

The industrial and process control systems scanning module 51 is configured to execute (run) system and network security, vulnerability, virus, link congestion, node congestions, based on predefined run cycle (schedule) or based on unplanned HMI triggered program callout. According to the exemplary configuration, the scanning module 51 has a complete database library for previous virus, antivirus, operating system batches, expert questionnaire results, and has the system correlation capabilities to compare the database to the outcomes of the module 51 to thereby identify anomalies. The scanning module 51 also has the capabilities to capture link performance, utilization, and node CPU processing utilization. The scanning module 51 can receive the scan output from all the systems and networks being evaluated, process any correlation therebetween, identify gaps or variances between the optimal security configuration and the detected security configuration, and have it sent to the risk level evaluator module 55. An example of the logic used to flag anomalies can be provided, for example, by the following: If "SCAN RESULT" NOT EQUAL "DATABASE REFERENCE" then flag as a violation.

The threats to vulnerabilities likelihood and consequences data repository module 53 is primarily configured to determine or otherwise identify the likelihood of threats and vulnerabilities occurrence and to define the consequences to both the individual impacted systems and the overall plant operation. According to the exemplary configuration, the module logic is based on multi-tier decision tree logic "if . . . then . . . else . . . ," starting with most likelihood vulnerability to least. The repository module 53 has interfaces with the risk level evaluator module 55 and risk assessment user interface module 57. In the exemplary configuration, input such as consequence entered by a user through utilization of a questionnaire, for example, and likelihood either entered by a user or obtained through automated scanning tools, is managed through the risk assessment user interface module 57. The repository module 53 can beneficially retain completed risk consequence data which can be used as input to the risk level evaluator module 55.

The risk level evaluator module 55 is primarily configured to identify "risk level" for each potential vulnerability that was captured by the industrial and process control systems scanning module 51 and the completed questionnaire by users through the risk assessment user interface module 57. According to the exemplary configuration, the risk level evaluator module 55 interfaces with the industrial and process control systems scanning module 51, the threats to vulnerabilities likelihood and consequences data repository module 53, and the risk assessment user interface module 57. The risk level evaluator module 55 has the capability to provide recommended corrective actions such as operating system batch upgrades and anti-virus upgrade requirements. Further, the module 55 can recommend traffic rerouting as a corrective action in response to identification of links and nodes that are highly utilized that may result in slowness, loss of view, and/or loss of control of a feature or capability of the respective industrial and process control application.

The risk assessment user interface module 57 is primarily configured to provide a front end user interface to execute the overall logic for the PN&S risk assessment workflow process. According to the exemplary configuration, interface module 57 functions to prompt a user to complete a questionnaire that is plant wide and/or specific to an individual application system, network or both. Module 57 interfaces with the industrial and process control systems scanning module 51, threats/vulnerabilities likelihood and consequences data repository module 53, and risk assessment result report repository module 59, and can also interface with the risk level evaluator module 55. The interface module 57, according to the exemplary configuration, also has the capability to interface with enterprise management systems 91 for initiating corrective measure workflows, with message alerting systems 93, test message and/or email based, and mitigation plan tracking systems 95 (example remedy system) to report risk assessment communication with pre-defined users or systems for rapid response to a mitigation plan and/or tracking. The module 57 also has the capability to generate reports for current and previously completed risk assessments, which can be printed or sent via email. Reports can be plain text, Microsoft, or PDF based, or in other formats such as, for example, HTML, etc.

The risk assessment report repository module 59 is primarily configured to provide data warehousing for all complete risk assessment. According to the exemplary configuration, the module is accessed through the risk assessment user interface module 57 and can generate reports by plant, generate reports by vulnerabilities, generate reports based on key performance indictors, support printing in different format, and support sending the generated reports to a local and/or remote printer.

The likelihood rating table/matrix 71 (FIG. 2) is primarily configured to provide a qualitative likelihood which indicates frequency of occurrence and or the projected/anticipated frequency of an occurrence of threat. In this regards, according to the exemplary configuration, the likelihood is defined as an estimate of the frequency or the probability of such an event and denoted by four categories namely "Very likely," "Likely," "Not Likely," and "Remote Chance." The table/matrix 71 reflects further definition of these terms. These items can be defined and updated in the repository 81. Note, the terms and categories are provided by way of example. Additional categories having different terms are, however, within the scope of the present invention.

The consequences-impact severity level table/matrix 73 (FIG. 3) is primarily configured to provide a template used to identify/determine the "Financial Value" of the consequences and undesirable event. In this regards, according to the exemplary configuration, the table/matrix template provides impact categories including "Injury," "Financial loss," "Environmental release," "Interruption of production," and "Public image (tarnishment)," for the following impact severity: "Severe," "Major," "Minor," and "No impact," which are defined within the table/matrix. These items can be defined and updated in the repository 81. Note, the terms and categories are provided by way of example. Additional categories having different terms are, however, within the scope of the present invention. Accordingly, it should be understood that table/matrix 73 can include the update flexibility to be managed by the end user. This flexibility accounts for the fact that different businesses and sites may have different interpretations of criticality. For example, some sites may define the severity of the "interruption of production" time with different time periods.

The risk level ratings table/matrix 75 (FIG. 4) is primarily configured to provide a qualitative value of the risk of an undesirable event occurring as a result of a likely presence of a threat which can capitalize on a specific identified vulnerability, in view of an anticipated impact level of the threat consequence. In this regard, according to the exemplary configuration, the table/matrix template provides "Threat Likelihood" categories (e.g., "Very likely," "Likely," "Not Likely," and "Remote Chance") across "Threat Consequences" categories (e.g., "Severe," "Major," "Minor," and "No impact"). Note, the terms and categories are provided by way of example. Additional categories having different terms are, however, within the scope of the present invention.

In the exemplary configuration, if Risk Level=4, the risk is unacceptable and an urgent action is required. In this case, an alarm message should be sent to the remedy system to implement a recommended mitigation plan immediately and to reassess the risk by re-running the program logic again. If Risk Level=3, the risk is unacceptable and an action is required. This will be forwarded, for example, to an enterprise resource planning (ERP) system to schedule the necessary mitigation plan. If Risk Level=2, the risk is acceptable and action is subject to management approval. This will be forwarded, for example, to the ERP system to initiate and approve the necessary mitigation plan. If Risk Level=1, the risk is acceptable and no action is required. This will be forwarded, for example, to the ERP system to document the findings. Note, as above, the specific risk level values and associated procedures are by way of example. Additional levels and/or procedures are, however, within the scope of the present invention.

According to the preferred configuration, the system 30 correlates the scanning outcomes to the data and templates defined in the different system modules. Beneficially, this process can function to substantially reduce the dependency or the need for specialized professionals to support such a complex exercise which, as described in detail below, includes data milling, mapping and reporting as defined by the system risk assessment process.

The system 30 can also include a software interface (not shown) primarily configured to interface the industrial and process control application risk assessment system 30 to other separate and/or independent systems. Beneficially, the interface can support Open Standard interfaces including Object Linking and Embedding (OLE) for process control. The interface provides an interface capability to external systems, such as, for example, the Enterprise Management Systems 91, Message Alerting Systems 93, and Mitigation Plan Tracking Systems 95. As such, beneficially, the results of the risk assessment, mitigation plan, workflows, and/or communication can be supported by either internal modules within the industrial and process control application risk assessment system 30 or other external systems including the Enterprise Management Systems 91, Message Alerting Systems 93, and Mitigation Plan Tracking Systems 95.

The system 30 can also include cyber security risk assessment program product 101 stored in the memory of the cyber security risk assessment computer 31 to perform the cyber security risk assessment on the plurality of process control networks and systems. The program product includes a set of instructions and/or sets of instructions forming modules, that when executed by the cyber security risk assessment computer 31 cause the computer to perform various operations described above and the method steps described below to include those that implement the functionality of the modules described above and the method steps described below. Note, the cyber security risk assessment program product 101 can be in the form of microcode, programs, routines, and symbolic languages that provide a specific set for sets of ordered operations that control the functioning of the hardware and direct its operation, as known and understood by those skilled in the art. Note also, the cyber security risk assessment program product 101, according to an embodiment of the present invention, need not reside in its entirety in volatile memory, but can be selectively loaded, as necessary, according to various methodologies as known and understood by those skilled in the art.

Figures 4, 5A:
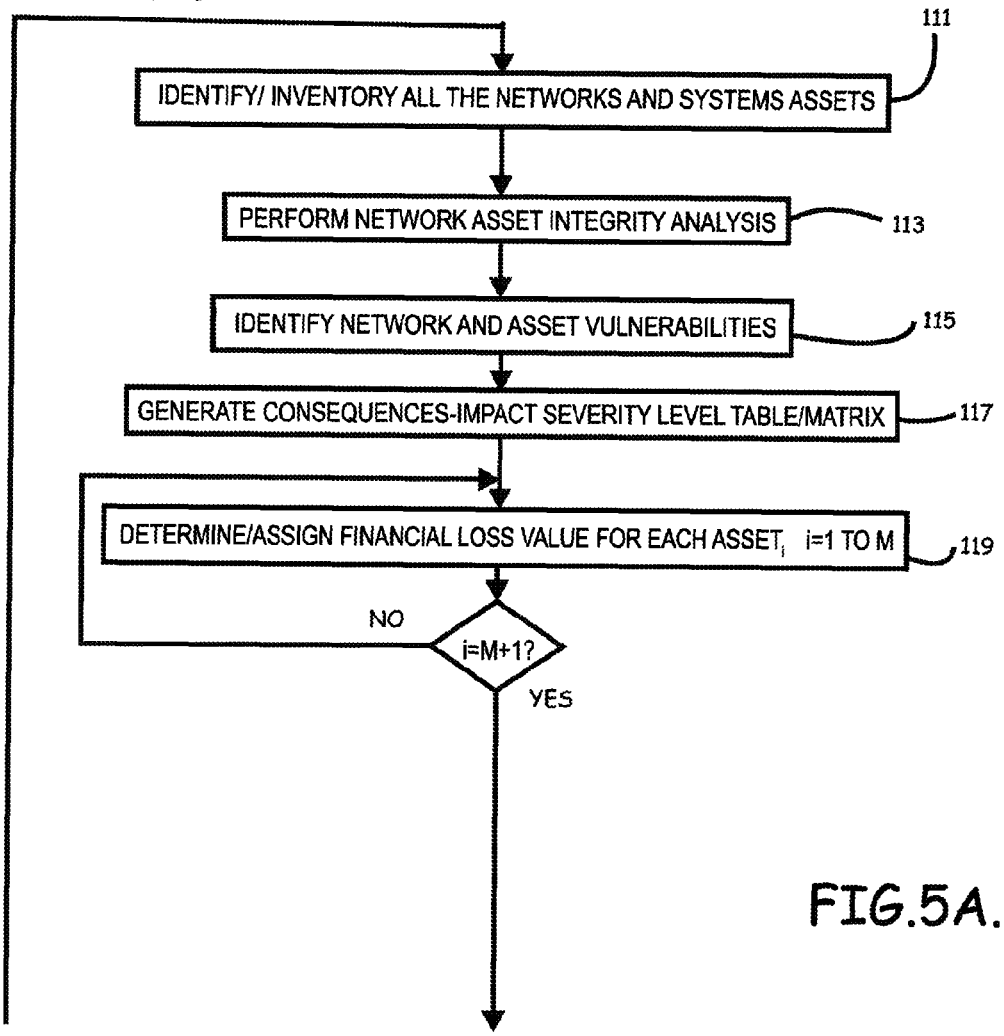
FIG. 4 is a risk level ratings table/matrix according to an embodiment of the present invention.
FIGS. 5A-5B a schematic flow diagram illustrating an exemplary method of performing a cyber security risk assessment a cyber security risk assessment on a plurality of process control networks and systems according to an embodiment of the present invention.
Figure 5B:
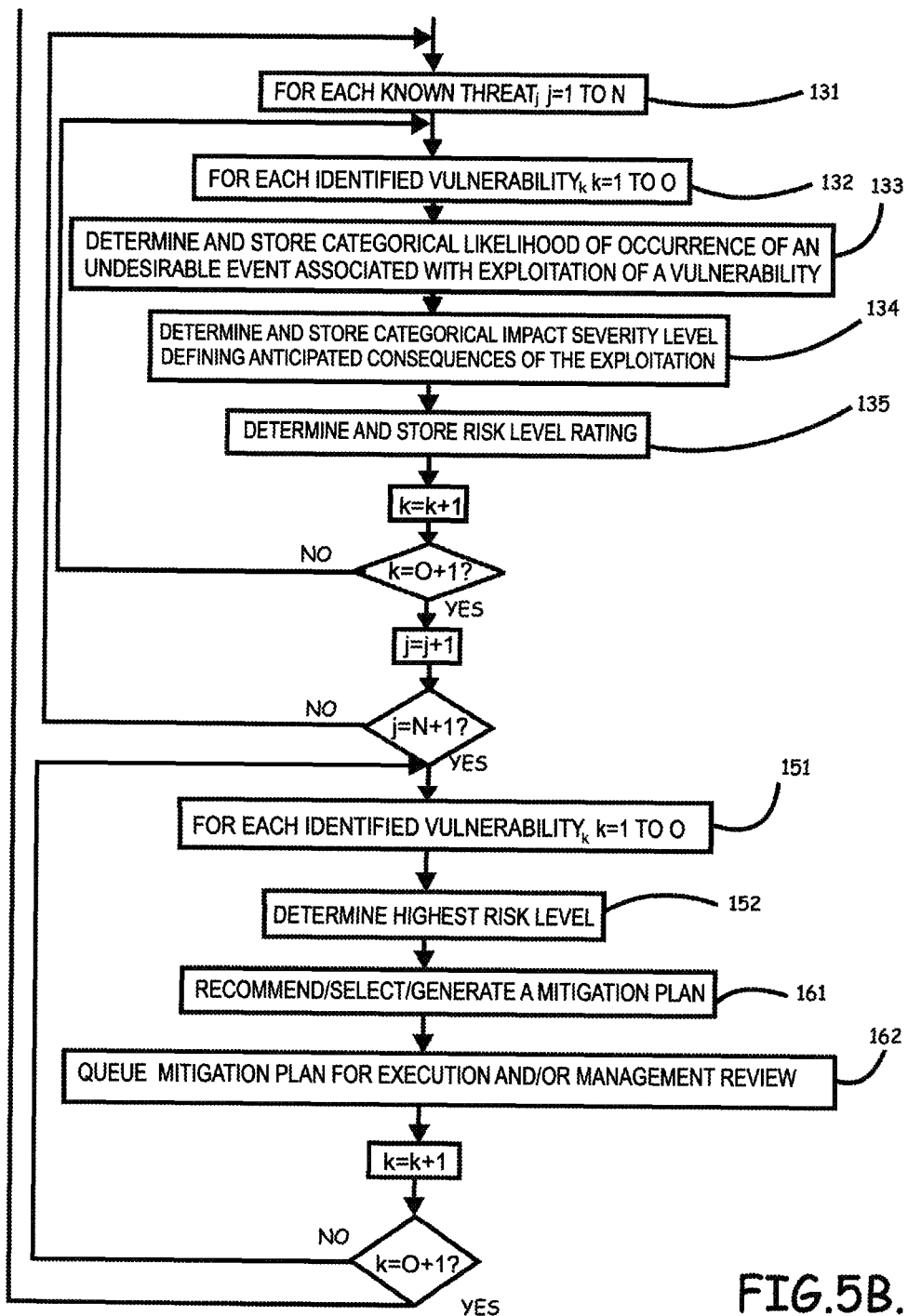

FIGS. 5A-5B illustrate a high-level flow diagram illustrating an exemplary method of performing a cyber security risk assessment a cyber security risk assessment on a plurality of process control networks and systems according to an embodiment of the present invention. According to the exemplary configuration, as an initial step to establish a knowledgebase, e.g., to be stored in the threat to vulnerabilities likelihood and consequences data repository 81, an inventory on all the networks and systems assets is performed to identify each of at least the primary networked assets within the plurality of process control networks and systems (block 111).

A network asset integrity analysis is also performed to identify networks and systems topology, network systems and asset security, and asset utilization to thereby determine susceptibility to each known threat (block 113). The analysis can include identification of current network security, known vulnerabilities, viruses, link and node congestion to include the level of traffic through each link and a level of performance, traffic, and node CPU utilization for each node, to determine the susceptibility each asset to each known threat to thereby determine each potential vulnerability (block 115).

Cyber security threats and vulnerabilities likelihood can be obtained automatically by scanning tools such as, for example, scanning module 51, and/or manually by systems security analysts and/or from international security organizations such as SANS. According to the exemplary configuration, the scanning tool 51 has the capability to detect and determine the network topology by utilizing a standard protocol such as, for example, the Simple Network Management Protocol. As part of its capabilities, nodes, trunks, and access ports performance data are collected and presented to the user. The tool can also show areas of network resource that are both under and over utilized. The information obtained both manually and through automated processes is defined and updated in the repository 81. Additionally, assets values can be documented and stored in the repository 81 through use of repository module 53.

Having identified each important network asset (individual and cluster) and its effect on other assets, a loss value associated with loss of control of the respective asset for each of a plurality of impact categories, such as, for example, in the form of the consequences-impact severity level table/matrix 73 shown in FIG. 3, can be assigned (block 117). Beneficially, this process step can be performed prior to the determination of the existence of a vulnerability and/or known threat affecting such vulnerability and/or after such determination.

The consequence or impact to certain predefined plant asset of a threat exploiting certain vulnerabilities can be determined based on the plant assets values inventory and this can be defined by the system analyst and the systems owner together. That is, having identified known threats, assets vulnerable to the known threats, a level of impact expected on the asset, and a likelihood rating (see, e.g., FIG. 2), a financial (loss) value can be assigned or otherwise determined for various categories of injuries according to various categories of impact level such as, for example, that shown in FIG. 3, for each asset ($A_i$); i=1 to M (block 119).

According to the exemplary configuration, as illustrated in blocks 131-134, the following is determined for each known threat ($T_j$); j=1 to N potentially impacting each of one or more vulnerabilities ($V_k$); k=1 to O: a categorical likelihood of occurrence of an undesirable event associated with exploitation of an associated identified vulnerability by the threat to thereby determine a separate categorical likelihood rating (e.g., very likely, likely, . . . ) for the respective threat with reference to the associated identified vulnerability (see also, FIG. 2), and a categorical impact severity level defining anticipated consequences (threat consequences) such as loss of control overview associated with exploitation of the identified vulnerability for each separate one of a plurality of impact categories (e.g., severe, major, . . . ) to thereby determine a highest impact severity level rating associated with the plurality of impact categories (see also, FIG. 3).

As an example, assume the scanning module 51 detected a process control system based on an operating windows system that does not have an antivirus program installed. In this scenario, the vulnerability is "there is no AntiVirus" software installed on the system. The Threat is "Virus Attack." The Likelihood of a "Virus Attack" occurrence is "Very Likely." The Impact Severity Level Is "Severe." The "Consequences" are an impact on the "Financial Value." The "Financial Value" (see, e.g., FIG. 3) is defined, for example, by the user based on the template/matrix 73 and updated in the repository module 81. These details are then ported into the repository module" 81 by the end user, for example, through the risk assessment user interface module 57.

As shown in FIG. 6, output from the industrial and process control systems scanning module 51, the threats to vulnerabilities likelihood and consequences data repository module 53, inputs from the system analyst through the risk assessment user interface module 57, if required, form the input for the risk level evaluator module 55 to calculate the risk level. Specifically, according to the exemplary configuration, once the user executes the assessment through the risk assessment user interface module 57, the system will run and report outcomes through risk level evaluator module 55, displayed via the risk assessment under interface module 57 and saved/documented in the risk assessment report repository 83 via the risk assessment report repository module 59. The level evaluator module 55 determines a risk level rating responsive to the categorical likelihood rating, and the highest impact severity level rating is determined for each known threat ($T_j$); j=1 to N potentially impacting each of one or more vulnerabilities ($V_k$); k=1 to O (block 135).

As illustrated above, threats and vulnerabilities are interconnected and related. According to the exemplary configuration, they are paired together to describe the likelihood that a certain threat that will exploit a certain vulnerability. Further, as illustrated above, the risk assessment process uses qualitative analysis techniques to determine the risk level and does not reflect exact numerical values. In order to convert risk level into a numerical value, a conversion table or matrix such as, for example, the risk level ratings table/matrix 75 shown in FIG. 4, can be employed.

Continuing with the example described above, the "vulnerability" is that there is no antivirus in a certain system; the "threat" is that a virus or malware will attack the unprotected system; and the likelihood of such attack is "Very Likely" and almost certain. The "consequence" to the system of such attack would be that the system would be down as a result of the attack, and the operator will lose control of the plant. Accordingly, from the above predefined consequences-impact severity level table/matrix 73 (see, e.g., FIG. 3), the impact severity level would be defined as "Severe." As such, noting that Risk Level is a factor of (Threat Likelihood X Vulnerabilities likelihood) X Consequences, the Risk Level would be "Very Likely" X "Sever." Referring to the above predefined risk level table/matrix 75 (see, e.g., FIG. 4) programmed in the risk level evaluator module 55, in this example, the risk of the undesirable event in view of the "loss effect" is assigned a risk level value of four (4), which means that the risk is unacceptable and an urgent action is required.

Referring to FIG. 3, the threat can, however, be classified using more than one impact category. As such, as shown in blocks 151-152, according to the exemplary configuration, the criticality rating (risk level) selected should be the rating that is most severe. That is, if certain multiple threats are identified or if a single threat has a different impact on multiple impact categories, the system can select the highest impact level to determine the Risk Level. This can be further explained in the following scenario: If we have multiple risks where one risk would cause less than 30 minutes of interrupted production (i.e., a minor impact level which translates to a Risk Level=2) and the second would cause a death (i.e., a severe impact level which translates to a Risk Level=4), the overall Risk Level is rated as 4—the highest in severity.

According to the exemplary configuration, a mitigation plan is developed via the risk level evaluator module 55 utilizing the information reported by the industrial and process control systems scanning module 51 and the information reported by the threats to vulnerabilities likelihood and consequences data repository module 53 by invoking a comparative analysis and correlation between the two data sources. The mitigation plan is then generated based on the results of the correlation output (block 161) and the mitigation plan is queued for execution (block 162). Execution can be either immediate or delayed depending on the determined risk level. Note, it should be understood that the "no impact" risk plan would not necessarily be a remedy plan, but rather, something on the order of management notification, etc.

By way of example, if the threats to vulnerabilities likelihood and consequences data repository module 53 has or indicates version #3 antivirus software is available and the scanned output shows the scanned system as version #1 antivirus software, then the data correlation output will show a variance in the antivirus version and will recommend a mitigation plan such as, for example, performing an update on the system with the version #3 antivirus software.

Stated more generically, if "SCAN RESULT" does not equal "DATABASE REFERENCE" then: flag as a violation, assign and queue "invoke DATABASE REFERENCE." For example, if the "password" does not equal "seven alphanumeric characters" then flag as a violation, where "violation" equals "Password Violation" and "mitigation plan" equals "seven alphanumeric characters."

FIG. 7 illustrates processing steps after determining the highest risk level for the respective threat-vulnerability. For example, assuming a risk level of four (4) entering a decision portion of the system 30 shown at 171, the system 30, according to the exemplary configuration, provides data to an alarm system 93 followed by a remedy system 95 and the enterprise management system 91. Assuming a risk level of three (3) entering the decision portion 171 of the system 30, in the illustrated configuration, the alarm system 93 and remedy system 95 is initially bypassed and the data is sent directly to the enterprise management system 91 for management determination regarding implementation and timing of any mitigation plan.

It is important to note that while the foregoing embodiments of the present invention have been described in the context of a fully functional system and process, those skilled in the art will appreciate that the mechanism of at least portions of the present invention and/or aspects thereof are capable of being distributed in the form of a computer readable medium in a variety of forms storing a set of instructions for execution on a processor, processors, or the like, and that embodiments of the present invention apply equally regardless of the particular type of media used to actually carry out the distribution. Examples of the computer readable media include, but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, HD-DVDs, memory sticks, mini disks, laser disks, Blu-ray disks, flash drives, and other newer types of memories, and certain types of transmission type media such as, for example, digital and analog communication links capable of storing the set of instructions. Such media can contain, for example, both operating instructions and the operations instructions described previously with respect to the program product 101 and the computer executable portions of the method steps according to the various embodiments of a method of performing a cyber security risk assessment, described above.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

The invention claimed is:

1. A computer-assisted method of performing a cyber security risk assessment on a plurality of process control networks and systems comprising a plurality of primary network assets at an industrial process facility, the method comprising the steps of:
   identifying each of the plurality of primary networked assets within the plurality of process control networks and systems to thereby identify associated networks and systems topology, network systems and asset security, and asset utilization;
   analyzing network asset integrity, with assistance of a computer, to include identifying networks and systems topology, network systems and asset security, and asset utilization to thereby determine susceptibility to each of a plurality of known threats;
   identifying, with assistance of the computer, each of a plurality of network and asset vulnerabilities when so existing responsive to determining network and asset susceptibility to each of the plurality of known threats;
   for each of the plurality of primary network assets of the plurality of process control networks and systems, determining, with assistance of the computer, a loss value associated with loss of control of the respective asset for each of a plurality of impact categories, the plurality of impact categories comprising injury, financial loss, environmental release, interruption of production, and public image associated with a loss of control of the respective asset;
   for each of the plurality of known threats and for each separate identified vulnerability exploitable by the respective threat,
      determining a categorical likelihood of occurrence of an undesirable event associated with exploitation of each respective associated identified vulnerability by the respective threat to thereby determine a separate categorical likelihood rating for the respective threat with reference to each respective associated identified vulnerability, and
      determining a categorical impact severity level defining anticipated consequences of loss of control associated with exploitation of each respective identified vulnerability exploitable by the respective threat for each separate one of a plurality of impact categories to thereby determine a highest impact severity level rating associated therewith, and
      determining a risk level rating responsive to the categorical likelihood rating and the highest impact severity level rating for the respective threat with reference to each respective identified vulnerability exploitable by the respective threat; and
   for each identified network and asset vulnerability,
      determining a highest risk level rating from among the risk level ratings associated with each impact category of the plurality of impact categories affected by an associated threat capable of exploiting the respective vulnerability when so existing
      identifying a mitigation plan responsive to the highest determined risk level, and
      executing the mitigation plan.

2. A method as defined in claim 1, wherein the impact severity level is determined utilizing a threat consequences matrix comprising the following matrix elements: impact category, impact severity, and qualitative value, and wherein the risk level rating is determined utilizing a risk level matrix comprising the following matrix elements: threat likelihood, threat consequences impact severity, and risk level rating to thereby standardize risk level assessment determinations.

3. A method as defined in claim 1, wherein the steps of determining a categorical likelihood of occurrence of an undesirable event associated with exploitation of each respective associated identified vulnerability by the respective threat and determining a loss value associated with loss of control of the respective asset for each of a plurality of impact categories includes distributing a questionnaire to at least one systems security expert and receiving questionnaire data comprising threat to vulnerabilities likelihood and loss valuation data.

4. A method as defined in claim 1, wherein the plurality of process control networks and systems comprise a plurality of redundant systems operating in parallel to control a same subset of the plurality of network assets.

5. A method is defined in claim 1, wherein the steps of analyzing network asset integrity and identifying each of a plurality of network and asset vulnerabilities includes employing an industrial and process control systems scanning module configured to execute system and network security, vulnerability, virus, link congestion, node congestion analysis to include determining a level of traffic through each link and a level of performance, traffic, and node processor utilization for each node to thereby identify any potential vulnerabilities.

6. A method is defined in claim 1, wherein the steps of determining a categorical likelihood of occurrence of an undesirable event and determining a categorical impact severity level include employing a threats to vulnerabilities likelihood and consequences data repository module configured to determine a likelihood of threats exploiting identified vulnerabilities responsive to the identified networks and systems topology and configured to identify consequences of the exploitation to individual impacted systems and to overall industrial process facility operation responsive to the determined loss value associated with loss of control of each respective asset for each of the plurality of impact categories.

7. A method is defined in claim 1, wherein the steps of determining a risk level rating and selecting a mitigation plan include employing a risk level evaluator module positioned to identify a risk level for any identified vulnerabilities responsive to a system and network security, vulnerability, virus, link congestion, and node congestion analysis to provide recommended corrective actions.

8. A method as defined in claim 1, wherein the risk level rating is a numerical risk level rating, and wherein the numerical risk level rating comprises the following categories: risk level 1 wherein risk is acceptable and no action is required, risk level 2 wherein risk is acceptable and action is subject to management approval, risk level 3 wherein risk is unacceptable and an action is required, and risk level 4 wherein risk is unacceptable and an urgent action is required.

9. A method is defined in claim 1, wherein the step of identifying a mitigation plan includes employing a risk level evaluator module configured to selectively perform the following steps:
recommending an operating system batch upgrade as a corrective action based upon a capability analysis of a current operating system batch and any detected anomalies;
recommending antivirus upgrade requirements as a corrective action based upon a capability analysis of a current version of antivirus software running on a system and any detected anomalies; and
recommending link and node network structure changes as a corrective action based upon detecting sustained activity through one or more links or nodes exceeding a threshold level of activity.

10. A method as defined in claim 1,
wherein the categorical likelihood rating comprises the following categories: very likely, likely, not likely, and remote chance; and
wherein the impact severity level rating comprises the following categories: severe, major, minor, and no impact.

11. A computer-assisted method of performing a cyber security risk assessment on a plurality of process control networks and systems comprising a plurality of primary network assets at an industrial process facility, the method comprising the steps of:
identifying, with assistance of a computer, each of the plurality of primary networked assets within the plurality of process control networks and systems to thereby identify associated networks and systems topology, network systems and asset security, and asset utilization;
analyzing network asset integrity, with assistance of the computer, responsive to identifying networks and systems topology, network systems and asset security, and asset utilization to thereby determine susceptibility to each of a plurality of known threats;
identifying, with assistance of the computer each of a plurality of network and asset vulnerabilities for the plurality of process control networks and systems when so existing responsive to determining network and asset susceptibility to each of the plurality of known threats;
for each of the plurality of primary network assets of the plurality of process control networks and systems,
determining a loss value associated with loss of control of the respective asset for each of a plurality of impact categories;
for each of the plurality of known threats for each separate identified vulnerability exploitable by the respective threat,
determining a risk level rating responsive to a categorical likelihood rating and a highest impact severity level rating across the plurality of impact categories for the respective threat with reference to each respective identified vulnerability exploitable by the respective threat; and
for each identified network and asset vulnerability,
determining a highest risk level rating from among one or more associated risk level ratings associated with a corresponding one or more impact categories affected by an associated threat capable of exploiting the respective vulnerability when so existing.

12. A method as defined in claim 11, further comprising for each of the plurality of known threats for each separate identified vulnerability exploitable by the respective threat:
determining a categorical likelihood of occurrence of an undesirable event associated with exploitation of each respective associated identified vulnerability by the respective threat to thereby determine a separate categorical likelihood rating for the respective threat with reference to each respective associated identified vulnerability; and
determining a categorical impact severity level defining anticipated consequences of loss of control associated with exploitation of each respective identified vulnerability exploitable by the respective threat for each separate one of a plurality of impact categories to thereby determine the highest impact severity level rating associated therewith.

13. A method as defined in claim 12,
wherein the categorical likelihood rating comprises the following categories: very likely, likely, not likely, and remote chance;
wherein the plurality of impact categories comprise injury, financial loss, environmental release, interruption of production, and public image associated with a loss of control of the respective asset; and
wherein the impact severity level rating comprises the following categories: severe, major, minor, and no impact.

14. A method as defined in claim 12,
wherein impact severity level is determined utilizing a threat consequences matrix comprising the following matrix elements: impact category, impact severity, and qualitative value; and
wherein the risk level rating is determined utilizing a risk level matrix comprising the following matrix elements: threat likelihood, threat consequences impact severity, and risk level rating to thereby standardize risk level assessment determinations.

15. A method is defined in claim 12, wherein the steps of determining a categorical likelihood of occurrence of an undesirable event and determining a categorical impact severity level include employing a threats to vulnerabilities likelihood and consequences data repository module configured to determine a likelihood of threats exploiting identified vulnerabilities responsive to the identified networks and systems topology and configured to identify consequences of the exploitation to individual impacted systems and to overall plant operation responsive to the determined loss value associated with loss of control of each respective asset for each of the plurality of impact categories.

16. A method is defined in claim 11, wherein the steps of analyzing network asset integrity and identifying each of a plurality of network and asset vulnerabilities includes employing an industrial and process control systems scanning module configured to execute system and network security, vulnerability, virus, link congestion, node congestion analysis to include determining a level of traffic through each link and a level of performance, traffic, and node CPU utilization for each node to thereby identify any potential vulnerabilities.

17. A method is defined in claim 11, further comprising the steps of:
determining a variance between optimal security configuration and detected security configuration; and
determining a mitigation plan responsive to the variance between the optimal security configuration and the detected security configuration and responsive to the highest determined risk level;

wherein the steps of determining a risk level rating and determining a mitigation plan include employing a risk level evaluator module positioned to identify a risk level for any identified vulnerabilities responsive to the results of a scanning module, and to provide recommended corrective actions.

18. A method as defined in claim 11, wherein the risk level rating comprises a numerical risk level rating, and wherein the risk level rating comprises the following categories: risk level 1 wherein risk is acceptable and no action is required, risk level 2 wherein risk is acceptable and action is subject to management approval, risk level 3 wherein risk is unacceptable and an action is required, and risk level 4 wherein risk is unacceptable and an urgent action is required.

19. A method as defined in claim 11, wherein the method further comprises executing a selected mitigation plan without additional human intervention for each identified network and asset vulnerability assigned a maximum risk level value and transferring risk assessment data to an enterprise management system for each identified network asset vulnerability having a certain risk level of less than the maximum risk level, mitigation plan implementation being determined within the enterprise management system.

20. A method is defined in claim 11, wherein the step of selecting a mitigation plan includes employing a risk level evaluator module configured to selectively perform each of the following steps:
recommending an operating system batch upgrade as a corrective action based upon a capability analysis of a current operating system batch and any detected anomalies,
recommending antivirus upgrade requirements as a corrective action based upon a capability analysis of a current version of antivirus software running on a system and any detected anomalies, and
recommending link and node network structure changes as a corrective action based upon detecting sustained activity through one or more links or nodes exceeding a threshold level of activity; and wherein the plurality of process control networks and systems comprise a plurality of redundant systems operating in parallel to control a same subset of the plurality of network assets.

21. A non-transitory computer readable medium embodying cyber security risk assessment program product comprising a set of computer-executable instructions to perform a cyber security risk assessment on a plurality of process control networks and systems comprising a plurality of primary network assets at an industrial process facility, the program product comprising the following modules:

an industrial and process control systems scanning module configured to identify networks and systems topology of the plurality of process control networks and systems for the industrial process facility through an automated process and to execute system and network security, vulnerability, virus, link congestion, node congestion analysis to thereby detect susceptibility to know threats to define potential vulnerabilities;

a threats to vulnerabilities likelihood and consequences data repository module configured to determine a likelihood of each of a plurality of known threats exploiting identified vulnerabilities responsive to the identified networks and systems topology and configured to identify consequences of the exploitation to individual impacted systems and to overall plant operation responsive to a determined loss value associated with loss of control of each respective networks and systems asset for each of a plurality of impact categories; and a risk level evaluator module configured to determine a numerical risk level rating for any identified vulnerabilities responsive to a determination of a categorical impact severity level for the plurality of impact categories and likelihood of the respective vulnerability being exploited by a known threat associated therewith.

22. The non-transitory computer readable medium as defined in claim 21, wherein the industrial and process control systems scanning module is further configured to correlate networks and systems security configurations with optimal configurations to identify any variances therebetween when so existing.

23. The non-transitory computer readable medium as defined in claim 21, wherein the node congestion analysis comprises determining the level of traffic through each network link and the level of performance; traffic, and node CPU utilization for each network node;

wherein the risk level evaluator module is further configured to determine a highest numerical risk level rating from among one or more associated numerical risk level ratings associated with a corresponding one or more impact categories affected by an associated threat capable of exploiting the respective vulnerability; and wherein the numerical risk level rating comprises the following numerical categories: risk level 1 wherein risk is acceptable and no action is required, risk level 2 wherein risk is acceptable and action is subject to management approval, risk level 3 wherein risk is unacceptable and an action is required, and risk level 4 wherein risk is unacceptable and an urgent action is required.

24. The non-transitory computer readable medium as defined in claim 21, wherein the threats to vulnerabilities likelihood and consequences data repository module is further configured to perform the following for each of the plurality of known threats for each separate identified vulnerability exploitable by the respective threat:

determining a categorical likelihood of occurrence of an undesirable event associated with exploitation of each respective associated identified vulnerability by the respective threat to thereby determine a separate categorical likelihood rating for the respective threat with reference to each respective associated identified vulnerability; and determining the categorical impact severity level defining a level of anticipated consequences of loss of control or view associated with exploitation of the respective identified vulnerability exploitable by the respective threat for each separate one of the plurality of impact categories to thereby determine a highest impact severity level rating associated therewith.

25. The non-transitory computer readable medium as defined in claim 24, wherein the categorical likelihood rating comprises the following categories: very likely, likely, not likely, and remote chance;

wherein the plurality of impact categories comprise injury, financial loss, environmental release, interruption of production, and public image associated with a loss of control or view of the respective asset; and wherein the impact severity level rating comprises the following categories: severe, major, minor, and no impact.

26. The non-transitory computer readable medium as defined in claim 24,
wherein impact severity level is determined utilizing a threat consequences matrix comprising the following matrix elements: impact category, impact severity, and qualitative value; and
wherein the numerical risk level rating is determined utilizing a risk level matrix comprising the following matrix elements: threat likelihood, threat consequences impact severity, and numerical risk level rating values to thereby standardize risk level assessment determinations.

27. The non-transitory computer readable medium as defined in claim 24, wherein the threats to vulnerabilities likelihood and consequences data repository module is further configured to perform the operations of distributing a questionnaire to at least one systems security expert and receiving questionnaire data comprising threat to vulnerabilities likelihood and loss valuation data to thereby determine the categorical likelihood of occurrence of an undesirable event associated with exploitation of each respective associated identified vulnerability by the respective threat and to thereby determine the loss value associated with loss of control or view of the respective asset associated with exploitation of the respective identified vulnerability exploitable by each respective threat.

28. The non-transitory computer readable medium as defined in claim 21, wherein the plurality of process control networks and systems comprise a plurality of systems operating in parallel to control a same subset of the plurality of network assets.

29. The non-transitory computer readable medium as defined in claim 21, wherein the risk level evaluator module is further configured to selectively perform the following operations:
recommending an operating system batch upgrade as a corrective action based upon a capability analysis of a current operating system batch and any detected anomalies;
recommending antivirus upgrade requirements as a corrective action based upon a capability analysis of a current version of antivirus software running on a system and any detected anomalies; and
recommending link and node network structure changes as a corrective action based upon detecting sustained activity through one or more links or nodes exceeding a threshold level of activity.

30. The non-transitory computer readable medium as defined in claim 21,
wherein the program product further comprises a set of instructions that when executed by a computer, cause the computer to perform the operation of executing a selected mitigation plan for each identified network and asset vulnerability having a minimum risk level to define a plurality of selected mitigation plans, each selected mitigation plan selected responsive to a determined risk level rating for the respective vulnerability; and
wherein the plurality of mitigation plans are executed at least partially sequentially, the vulnerabilities having a highest categorical rating executed prior to those with a lower categorical rating.

31. A cyber security risk assessment system to perform a cyber security risk assessment on a plurality of process control networks and systems comprising a plurality of primary network assets at an industrial process facility, the system comprising:
a cyber security risk assessment computer having a processor and memory in communication with the processor to store software therein;
a threats to vulnerabilities likelihood and consequences data repository stored in memory accessible to the cyber security risk assessment computer;
a risk assessment report data repository stored in memory accessible to the cyber security risk assessment computer; and
cyber security risk assessment program product stored in the memory of the cyber security risk assessment computer to perform the cyber security risk assessment on the plurality of process control networks and systems, the program product including instructions that when executed by the cyber security risk assessment computer cause the computer to perform various operations to include the operations of:
identifying each of the plurality of primary networked assets within the plurality of process control networks and systems to thereby identify associated networks and systems topology, network systems and asset security, and asset utilization,
analyzing network asset integrity responsive to identifying networks and systems topology, network systems and asset security, and asset utilization to thereby determine susceptibility to each of a plurality of known threats,
identifying each of a plurality of network and asset vulnerabilities for the plurality of the process control networks and systems when so existing responsive to determining network and asset susceptibility to each of the plurality of known threats,
for each of the plurality of primary network assets of the plurality of process control networks and systems,
determining a loss value associated with loss of control of the respective asset for each of a plurality of impact categories,
for each of the plurality of known threats for each separate identified vulnerability exploitable by the respective threat,
determining a risk level rating responsive to a categorical likelihood rating and a highest impact severity level rating for the respective threat with reference to each respective identified vulnerability exploitable by the respective threat, and
for each identified network and asset vulnerability,
determining a highest risk level rating from among one or more associated risk level ratings associated with a corresponding one or more impact categories affected by an associated threat capable of exploiting the respective vulnerability when so existing.

32. A system as defined in claim 31, wherein the operations further comprise for each of the plurality of known threats for each separate identified vulnerability exploitable by the respective threat:
determining a categorical likelihood of occurrence of an undesirable event associated with exploitation of each respective associated identified vulnerability by the respective threat to thereby determine a separate categorical likelihood rating for the respective threat with reference to each respective associated identified vulnerability; and
determining a categorical impact severity level defining anticipated consequences of loss of control associated with exploitation of each respective identified vulnerability exploitable by the respective threat for each separate one of a plurality of impact categories to thereby determine a highest impact severity level rating associated therewith.

33. A system as defined in claim 32,
wherein the categorical likelihood rating comprises the following categories: very likely, likely, not likely, and remote chance;
wherein the plurality of impact categories comprise injury, financial loss, environmental release, interruption of production, and public image associated with a loss of control of the respective asset; and
wherein the impact severity level rating comprises the following categories: severe, major, minor, and no impact.

34. A system as defined in claim 32,
wherein impact severity level is determined utilizing a threat consequences matrix comprising the following matrix elements: impact category, impact severity, and qualitative value; and
wherein the risk level rating is determined utilizing a risk level matrix comprising the following matrix elements: threat likelihood, threat consequences impact severity, and risk level rating to thereby standardize risk level assessment determinations.

35. A system is defined in claim 32, wherein the operations of determining a categorical likelihood of occurrence of an undesirable event and determining a categorical impact severity level include employing a threats to vulnerabilities likelihood and consequences data repository module configured to determine a likelihood of threats exploiting identified vulnerabilities responsive to the identified networks and systems topology and configured to identify consequences of the exploitation to individual impacted systems and to overall plant operation responsive to the determined loss value associated with loss of control of each respective asset for each of the plurality of impact categories.

36. A system is defined in claim 31, wherein the operations of analyzing network asset integrity and identifying each of a plurality of network and asset vulnerabilities includes employing an industrial and process control systems scanning module configured to execute system and network security, vulnerability, virus, link congestion, node congestion analysis to include determining a level of traffic through each link and a level of performance, traffic, and node CPU utilization for each node to thereby identify any potential vulnerabilities.

37. A system is defined in claim 31,
wherein the operations further comprise:
determining a variance between optimal security configuration and detected security configuration, and
determining a mitigation plan responsive to the variance between the optimal security configuration and the detected security configuration and responsive to the highest determined risk level; and
wherein the operations of determining a risk level rating and determining a mitigation plan include employing a risk level evaluator module positioned to identify a risk level for any identified vulnerabilities responsive to the results of a scanning module, and to provide recommended corrective actions.

38. A system as defined in claim 31, wherein the risk level rating comprises a numerical risk level rating, and wherein the numerical risk level rating comprises the following categories: risk level 1 wherein risk is acceptable and no action is required, risk level 2 wherein risk is acceptable and action is subject to management approval, risk level 3 wherein risk is unacceptable and an action is required, and risk level 4 wherein risk is unacceptable and an urgent action is required.

39. A system as defined in claim 31, wherein the operations further comprise executing a selected mitigation plan without additional human intervention for each identified network and asset vulnerability assigned a maximum risk level value and transferring risk assessment data to an enterprise management system for each identified network asset vulnerability having a certain risk level of less than the maximum risk level, mitigation plan implementation being determined within the enterprise management system.

40. A system is defined in claim 31,
wherein the operation of selecting a mitigation plan includes employing a risk level evaluator module configured to selectively perform one or more of the following operations:
recommending an operating system batch upgrade as a corrective action based upon a capability analysis of a current operating system batch and any detected anomalies,
recommending antivirus upgrade requirements as a corrective action based upon a capability analysis of a current version of antivirus software running on a system and any detected anomalies, and
recommending link and node network structure changes as a corrective action based upon detecting sustained activity through one or more links or nodes exceeding a threshold level of activity; and
wherein the plurality of process control networks and systems comprise a plurality of redundant systems operating in parallel to control a same subset of the plurality of network assets.

* * * * *